Jan. 17, 1961 K. REINER 2,968,329
GANG NUT RETAINER AND SHROUD ASSEMBLY THEREFOR
Filed June 19, 1957 2 Sheets-Sheet 1

KENNETH REINER
INVENTOR.

BY

ATTORNEY

Jan. 17, 1961 K. REINER 2,968,329
GANG NUT RETAINER AND SHROUD ASSEMBLY THEREFOR
Filed June 19, 1957 2 Sheets-Sheet 2

KENNETH REINER
INVENTOR.

BY

ATTORNEY

United States Patent Office 2,968,329
Patented Jan. 17, 1961

2,968,329

GANG NUT RETAINER AND SHROUD ASSEMBLY THEREFOR

Kenneth Reiner, Box 2001, Terminal Annex, Los Angeles, Calif.

Filed June 19, 1957, Ser. No. 666,561

6 Claims. (Cl. 151—41.71)

This invention relates to gang-nut retainer assemblies such as used extensively in airplane construction, and including a channel shaped member in which a series of nuts are supported at intervals along the channel. More specifically this invention relates to gang-nut retainers of the class described in combination with shroud means therefor, for smoothly covering the bolt ends and nut bodies of such gang-nut assemblies. One advantage of such construction is to obviate the possibility of injury to fragile aircraft components by chafing or cutting which might be caused by bearing or rubbing against the upper ends of such bolt or nut bodies.

Gang-nut assemblies of the general type to which the present invention is directed usually comprise an elongated channel member having a base web and having means, usually an inwardly directed side flange, for holding individual nuts in the channel. The nuts employed in such assemblies usually include a plate-form base, or base plate, the side edges of which lie adjacent to the side flanges of the channel member which loosely retains the nuts in the channel and allow some lateral movement, or play. The channel member is usually provided with spaced upwardly-projecting means to allow limited longitudinal movement of the nuts, and these projections are so placed as to position the nuts in a generally central relation to a hole thereunder in the base web.

In practice, each nut is formed with a threaded sleeve integral with its base-plate and the nuts are usually referred to as "floating" in the channel by reason of the fact that they possess a slight degree of lateral and longitudinal play. The "floating" arrangement is to permit the axis of the threaded sleeve of each nut to be more accurately aligned with the threaded portion of a screw or bolt that may extend through the plate and the web of the channel even though said screw or bolt is not located precisely in alignment with said nut's nominal hole location.

When the threaded member intended to be attached in the nut is thrust through the registering openings in the web of the retainer channel and in the base plate of the nut, considerable force may be exerted, which tends to force the nut away from the web and out of the channel. The necessity for the gang nut retainer to have certain minimum resistance to this force is referred to in appropriate government specifications for such assemblies, to insure that the channels will operate satisfactorily in use, and this particular ability to resist this force is known as the "push-out" strength of an anchor nut or gang channel. As a related problem, in aircraft and guided missile usages, size and weight are primary considerations. Accordingly, one of the basic design problems in assemblies of the class discussed is the provision of gang channel retainer constructions characterized by substantial "push-out" strength combined with a minimum of size and weight.

When gang-nut retainers of the type under discussion are utilized in areas where vibration or rubbing of fragile aircraft components against the edges of bolt ends or nut bodies might cause chafing or cutting of such components, serious problems of maintenance are raised. This difficulty may be obviated by the provision of an enclosure, or shroud, fitting over the channel member and smoothly covering the exposed ends of the bolts and nuts. Here again, weight is a prime consideration and a shroud member must be as light in weight as possible and have simple and reliable means for attachment to the channel.

It is, therefore, an object of this invention to provide an improved gang-nut assembly wherein improved "push-out" strength characteristics are attained in a gang-nut retaining channel of minimum size and weight.

Another object of this invention is to provide an improved form for the side flanges of gang-nut retaining channels which will effectively resist "push-out" forces to which nuts retained in the channels may be subjected while permitting the required "floating" movement of such nuts.

Still another object of this invention is to provide novel gang channel constructions of exceptionally narrow width wherein the side flanges are of a form to provide an increased amount of overhang over the side edges of the base plates of the nuts without interfering with the desired lateral "floating" characteristics of the nuts.

A still further object of the present invention is to provide novel gang-channel constructions wherein the side flanges are bent sharply downwardly to provide an edge facing the top of the base of a nut in the channel whereby to have a tendency to spread inwardly over the nut and better retain the nut if deformed by "push-out" forces.

Yet another object of this invention is to provide gang-channel constructions wherein the side flanges are of extreme strength relative to their weight and height by virtue of novel construction wherein the flanges are longitudinally folded back upon themselves to provide a double thickness of material and are displaced laterally at intervals to provide added strength by virtue of the resulting corrugated or wave-form configuration.

Another object of the invention is to provide a design wherein one simple deforming operation on the downwardly turned inwardly directed flanges of gang-nut retaining channel is effective (1) to provide lateral stop means for holding the nuts in place; (2) to increase the channel's resistance to "push-out" forces by increasing the amount of overhang over the bases of the nuts; and (3) to add rigidity to the flange by giving it a corrugated or wave-form configuration.

Another object of the invention is to provide novel means for covering or shrouding a gang-nut retainer, wherein the shroud is of minimum size and weight by virtue of the fact that it is connected to the channel by clips at spaced intervals and does not require the side walls of the shroud to extend over the sides or under the base of the channel member to form the connection.

Yet another object of the invention is to provide a novel shrouded gang-nut retainer assembly wherein lances or tabs formed in the side flanges of the retainer channel perform a triple function, namely (1) to limit the "floating" longitudinal movement of the nuts; (2) to deform the side flanges inwardly to give greater overhang and rigidity to said flanges; and (3) to provide means for holding shroud supporting clips.

A still further object of the present invention is to provide a novel assembly wherein shroud means are used for covering a gang-nut retainer and wherein clip means serve to support the shroud means in assembled relationship with the retainer channel, whereby the shroud need not necessarily laterally overlie the side walls of the channel, thus effecting a substantial weight and space saving.

Yet another object of this invention is to provide a shroud assembly wherein separate individual clip means are adapted to be connected to a channel member and to a shroud member to support said members in assembled relationship.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
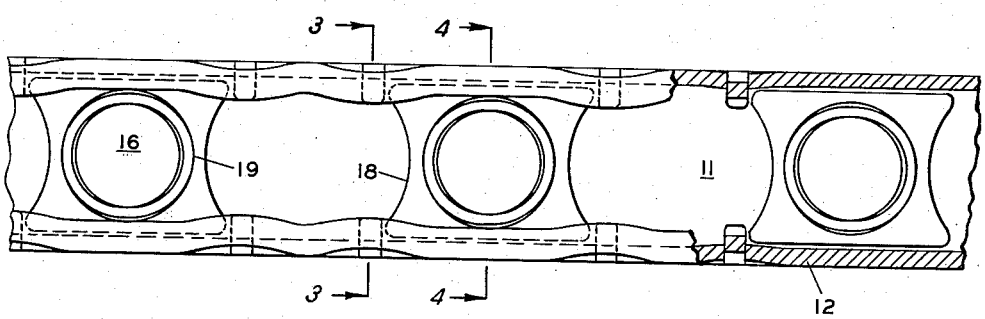
Figure 1 is a plan view of a gang channel according to the present invention, with parts broken away for clarity of illustration.
Figure 2:
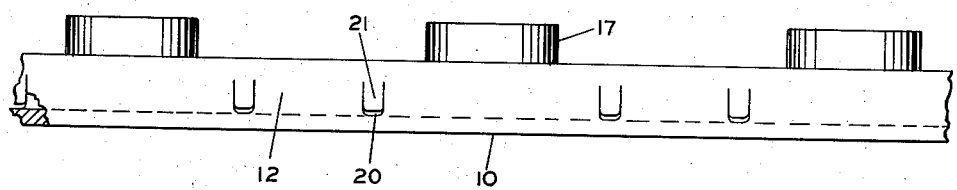
Figure 2 is a side view thereof.
Figure 3:
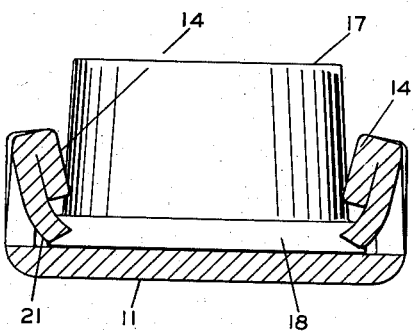
Figure 3 is a section taken along the lines 3—3 of Figure 1.

Referring now more particularly to the drawings, and especially to Figures 1 to 4 thereof, the channel 10 is provided with a base web 11 and upwardly extending flanges 12. Each of the flanges 12 has an upstanding side-wall portion which is bent inwardly and downwardly at its free end to form overhanging nut-retaining portions 14, with the portions 14 preferably in unbroken contact with the portions 12. The lengths of portions 14 are such as to leave a space between the lower ends of said portions 14 and the web 11. The web of the channel is provided with a series of spaced openings 16.

Figure 4:
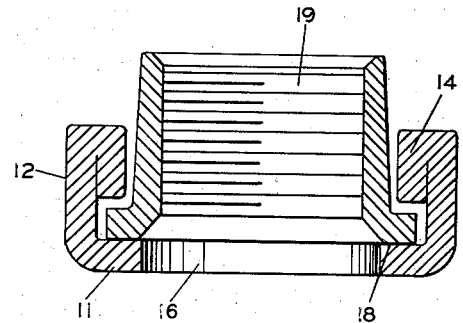
Figure 4 is a section taken along the line 4—4 of Figure 1.
Figure 5:
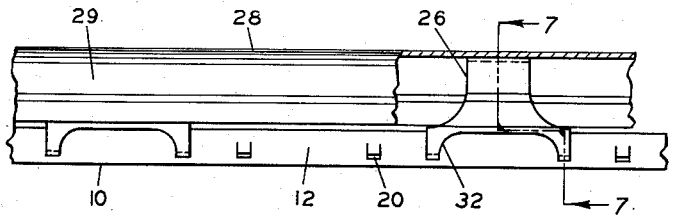
Figure 5 is a side elevation of a gang channel as shown in Figure 2 with a shroud assembled thereon in accordance with the present invention, and having parts broken away for clarity of illustration.
Figure 6:
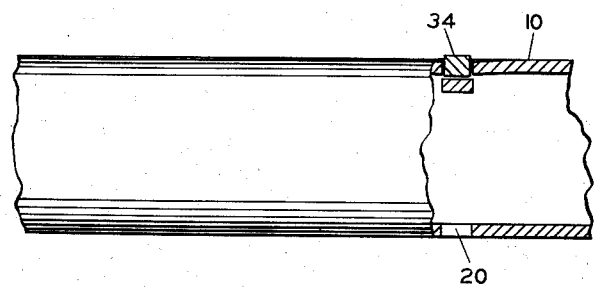
Figure 6 is a plan view of structure as shown in Figure 5 enlarged, and with parts broken away along a line 6—6 in Figure 7.

Nuts 17 are seated in the channel and each comprises a base member 18 and a threaded shank 19, the base members 18 extending laterally from the shank and having the sides thereof positioned in the spaces between the lower edges of the portions 14 and the web 11 as shown in Figure 4.

In order to restrict the floating nuts to a small controlled area of longitudinal movement, the upwardly extending flanges 12 are pierced as at 20 to form inwardly extending tabs 21 adjacent the edges of the nuts. Tabs 21 are formed by substantially U-shaped cuts in the side flanges 12, with the bight of the cuts substantially parallel to and closely adjacent to the web 11, and with the arms of the U-shaped cuts generally perpendicular to the web. Thus, the tabs 21 are generaly rectangular in form and and are perpendicularly disposed relative to the web 11, with integral roots adjacent the top of the flanges 12 and free ends adjacent and above the web 11. The free ends of the tabs are bent inwardly as shown to restrict movement of the nuts, it being noteworthy that the side edges of the tabs are adapted to be engaged by the nuts and that the forces acting against the tabs are in shear against the sides of the tabs in contradistinction to prior devices wherein the faces of similar retaining tabs are subject to bending movement forces which can move more easily deform the tabs to release the nuts.

By virtue of the extent of the downwardly extending portions 14, the inward bending of tabs 21 results in an inward bending of the flanges 12, giving a wavy effect, or "corrugation" as indicated in Figure 1. This construction is most clearly shown in Figure 3, which illustrates the inward bending of the flanges 12 and attached portions 14, as indicated at 14–a, and shows how the amount of overhang of the flange portions 14 is increased at these points to thereby increase resistance to the "push-out" force to which the nuts are subjected.

The construction described in the preceding paragraphs provides several advantages over prior known gang-nut retainer channels. In the first place it should be noted that the side edges of the base members 18 are engaged under the flat end edges of the downwardly-extending portions 14. Accordingly there is, in effect, a "hook" action assisting in resisting separation of the nuts due to "push-out" forces since forces applied by the nut base against the said end edges tend to deform the edges upwardly which results in their spreading inwardly over the nut bases rather than being pushed laterally outwardly as a rounded camming surface would be. Secondly, the inward bending of the flanges 12 at spaced intervals provides a wavy or "corrugated" plan-form, adding stiffness to the structure.

From the above it may be seen that the present invention provides a novel gang-channel construction wherein the nut retaining flanges are inwardly indented adjacent nuts retained therein to increase the "push-out" strength of the channel.

Moreover, as a separate but related phase of this invention, the inclusion of longitudinal nut motion restraining tabs which are cut or lanced from the side walls of the channel makes it possible to form and indent the tabs and indent the side flanges in a single operation, if desired, for ease and economy of fabrication.

As a third related phase of this invention, the provision of restraining downwardly extending tabs 21, formed by cutting the side walls of the channel and pushing the tabs inwardly, results in a perforate side-wall construction which particularly lends itself to support of a shroud assembly without further modification of the gang channel. Such an arrangement makes possible the attachment of the gang channel to a panel, as with any conventional channel, and the easy subsequent attachment of a shroud or cover, if desired, and is made possible by the fact that the tab 21 and the opening 20 left thereby perform the dual function of restraining longitudinal movement of the nuts in the channel and of supporting a shroud assembly as will be described hereinafter.

Attention is now directed to Figures 5 to 8, which illustrate a shroud assembly particularly adapted for use with the gang channel construction previously described. The shroud assembly generally comprises a series of clips 26 adapted to be supported by the channel and which, in turn, support a shroud member 28.

Figure 7:
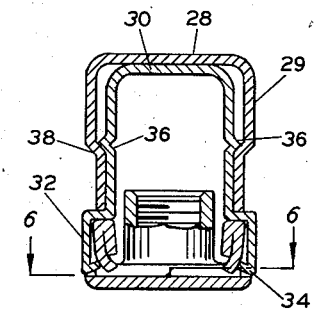
Figure 7 is a section taken along the line 7—7 of Figure 5 illustrating the relationship of the various component parts of the shroud assembly.

More specifically, each clip member 26 is a thin-walled body having a main portion 30 of generally U-configuration in cross-section and of relatively short length. The clip portion 30 is of a width to substantially overlie the flanges 14 and of a height greater than the expected protrusion of any bolt intended to be inserted through the nut shank 19, as best illustrated in Figure 7. The main portion 30 terminates in a pair of outwardly and downwardly turned flanges 32 which contact the side flanges 12 of the channel member 10. The flanges 32 are of a length to overlie at least two adjacent openings 20 in the channel side wall and have integral inturned lugs 34 appropriately spaced to be inserted into the openings 20, as best seen in Figure 7, to hold the clip in a position overlying the channel. The clips 26 may further be provided with shroud positioning and retaining means such as, for example, a longitudinal V corrugation 36 on the main body of the clip, adapted to cooperate with a mating V shape on the shroud body. Obviously, the exact nature and shape of such holding and positioning means is not critical and they may take forms other than the specific longitudinal V corrugation which is illustrated in the drawings as a preferred embodiment.

Shroud member 28 is a thin-walled strip having a roughly U-form cross-section with side walls 29 of a size to closely internally receive the main bodies 30 of a plurality of clip members 26 with the edges of the shroud resting on the flanges 32 of the clip members, as illustrated in Figure 7. The specific cross-sectional configuration of the shroud is not critical. A given shroud is, of course, made of a length to smoothly cover a desired length of gang channel, and is provided with appropriate holding and positioning means to define its position relative to the clips 26 and to retain the shroud in that position. In the illustrated example, an outwardly deformed longitudinal bend 38 is shown, and cooperates with the corrugation 36 on the clip members to position and secure the shroud member. If desired, a full V corrugation may be provided on the shroud member to cooperate with the corrugation 36 of the clip.

The clip 26 is preferably of the resilient sheet material so that it may be expanded over the side walls 12 of the gang channel member and resiliently snap into its assembled position with the lugs 34 of the clip engaged in the openings 20 of the channel member. The rectangular shape and the direction of tabs 21 are such that the side walls 20 of the holes from which they are formed are substantially straight and disposed substantially perpendicularly to the top and bottom of the gang channel. Accordingly, the lugs 34 slide in the openings easily with the lugs 34 riding the outer wall of the tabs 21 into their final assembled position. Shroud 28 may be of any sheet metal material, either resilient or non-resilient, although the resilient construction is preferable for reasons to be stated hereinafter. For rigid constructions the shroud may be slid over the clip members longitudinally to effect the assembly satisfactorily. However, if the shroud member is constructed of resilient material advantages of ease of assembly and of reinforced resistance to separation of the parts are achieved, since the shroud may be snapped over the clip members and the resilience of the side walls 29 of the shroud press the side walls and flanges 32 of the spring clip member inwardly to add to the force exerted by the resilience of the clip member in retaining the lugs 34 in the channel openings 20. For this purpose the normal unstressed cross-sectional form of the shroud members (when of resilient materials) may be such that the walls 29 thereof are normally slightly convergent prior to assembly.

The various parts described hereinabove may obviously be stamped or otherwise formed of a wide variety of materials, depending upon the specific uses and stresses intended to be encountered, the present invention, in its broadest aspect relating to the structural arrangement of the various parts rather than the specific materials used therein.

The novel gang-nut retaining construction described herein is utilized in the conventional manner, as by riveting the channel to a structural member having holes matching the spaced openings 16 in the channel and connecting a second structural member thereto by providing matching holes therein and threading a bolt member through the matching holes of the two structural members, the channel web, and the lock-nuts retained in the channel. The shroud assembly, as described hereinabove, may be assembled, of course, either before or after the threaded connections are made, this assembly being effected by positioning clips 26 at spaced positions along the gang channel and by snapping or sliding the shroud member 28 into final assembled relationship with the clips, as previously described.

Figure 8:
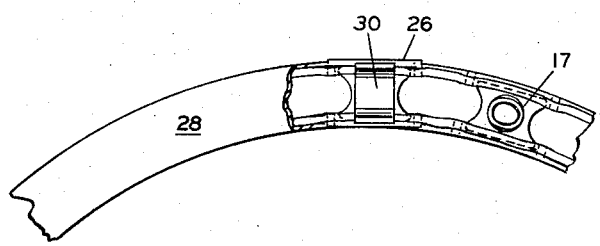
Figure 8 is a plan view of a shrouded gang channel according to this invention, in a curved configuration.

While no reference to the planform configuration of devices as described above have been discussed, it should be obvious that the channels may be fabricated in any desired curved planform, although Figures 1 to 7 represent the application of this invention to straight channels. Figure 8, showing a curved configuration is merely by way of example, to illustrate the utilization of the present invention in constructions requiring the use of curved channel.

From the above, it may be seen that the present invention provides new and improved gang-nut retainer constructions and novel shroud assemblies for cooperation with such retainers.

It should be understood, of course, that the foregoing disclosure relates to only preferred embodiments of the invention and that numerous modifications or alterations may be made therein without departing from the spirit and scope of the invention. It is accordingly to be understood that the invention is intended to be limited by the scope of the appended claims rather than by the specific illustrated examples.

What is claimed is:

1. A gang nut and retainer assembly comprising a channel having a web and side flanges extending upwardly therefrom; said flanges each comprising a side wall portion the free end of which is bent inwardly and downwardly and has an edge terminating so as to leave a space between said edge and said web, a plurality of nuts seated in said channel with each of said nuts having a threaded barrel and a base extending into said space; the side wall portions of said flanges being pierced at spaced locations between said nuts to form inwardly extending tabs operative to engage the bases of the nuts to limit longitudinal movement of said nuts in said channel, said tabs having their root portions substantially in a line parallel to and spaced from said web and having downwardly extending inwardly bent free end portions, whereby forces exerted on said tabs by nuts tending to move longitudinally in said channel are exerted as shear forces against the side edges of the tabs, said flanges having lateral wave-like indentations which have maximum lateral displacement at said spaced locations and minimum lateral displacement in the vicinity of said threaded barrels to present a wave-like appearance in the plan view.

2. A gang nut and retainer assembly comprising a channel having a web and side flanges extending upwardly therefrom; said flanges each comprising a side wall portion the free end of which is bent inwardly and downwardly and has an edge terminating above said web so as to leave a space between said edge and said web, a plurality of nuts seated in said channel with each of said nuts having a threaded barrel and a base extending into said space; said flanges being pierced at spaced locations between said nuts to form inwardly extending tabs operative to engage the bases of said nuts to allow restricted longitudinal movement of said nuts in said channel, said tabs having their root portions substantially in a line parallel to and spaced from said web and having downwardly extending inwardly bent free end portions, whereby forces exerted on said tabs by nuts tending to move longitudinally in said channel are exerted as shear forces against the side edges of said tabs, said flanges being bent laterally inwardly at said spaced locations to present a wave-like appearance in plan view, the lateral displacement of said flanges being a maximum at said locations and a minimum in the vicinity of the threaded barrels of said nuts, said tabs being spaced slightly from the edges of said nut bases to permit a limited longitudinal movement of said nuts in said channel, and said space being slightly greater than the thickness of said nut bases to permit a limited vertical movement of said nuts in said channel.

3. A gang nut and retainer assembly comprising a channel having a web and side flanges extending upwardly therefrom; said flanges each comprising a side wall portion the free end of which is bent inwardly and downwardly and has an edge terminating so as to leave a space between said edge and said web, a plurality of nuts seated in said channel with each of said nuts having a base extending into said space; the side wall portions of said flanges being pierced at spaced opposed locations between said nuts to form inwardly extending tabs operative to restrain longitudinal movement of said nuts in said channel and to form complementary openings in the side flanges of said channel, said flanges being bent laterally inwardly at said spaced opposed locations to present a wave-like appearance in the plan view, clip means comprising main body portions and downwardly extending lugs, said lugs being engageable in said openings to support said main body portions in a position above and overlying said channel, and shroud means supported on said clip means entirely above said channel, whereby a minimum of shroud material is required to overlie and enclose said channel and the nuts therein.

4. A gang-nut and retainer assembly comprising a channel having a web and side flanges extending upwardly therefrom; said flanges each having means spaced from and overlying said web to provide a space between said means and said web, a plurality of nuts seated in said channel with each of said nuts having a base extending into said space; said flanges being pierced at spaced opposed locations between said nuts to form inwardly extending tabs and to form complementary openings in the side flanges of said channel, a plurality of clip means, each of said clip means, having opposed downwardly extending leg portions and an upwardly extending main body portion, said leg portions being inserted in said openings and resiliently engaging the outer surfaces of said tabs, whereby said tabs are operative to restrain said nuts against longitudinal movement in said channel and are also operative to retain said clip means in assembly with said channel with said main body portions overlying said channel, and shroud means supported by the main body portions of said clip means to overlie and enclose said channel, each of said clip means being of stepped construction and having inwardly directed shoulders integrally connecting its downwardly extending leg portions with its upwardly extending main body portion, said shoulders resting upon the upper edges of the side flanges, said shroud means being of elongated channel form and having longitudinal edges in engagement with the upper surfaces of said shoulders, whereby said shroud means is supported entirely above the upper edges of the side flanges.

5. The gang-nut and retainer assembly of claim 4 further characterized in that the shroud is of resilient material and in that the transverse distance between the longitudinal edges of the shroud means when disassembled is slightly less that the outer transverse dimension of the main body portions of said clips in the plane of the connection of said main body portions to said shoulders, whereby said shroud is resiliently retained in assembled relationship with said main body portions.

6. A shroud channel assembly comprising an elongated channel having a web and upwardly extending side flanges, said side flanges having opposed openings therein, a plurality of clip means, each of said clip means comprising opposed downwardly extending leg portions and an upwardly extending main body portion, said leg portions being resiliently engaged in said openings, each of said clip means being of stepped configuration and having inwardly directed shoulders integrally connecting its downwardly extending leg portions with its upwardly extending main body portion, said shoulders resting upon the upper edges of said side flanges, and shroud means supported by the main body portions of said clip means, said shroud means being of elongated channel form and having longitudinal edges in engagement with the upper surfaces of said shoulders, whereby said shroud means is supported entirely above the upper edges of said side flanges.

References Cited in the file of this patent

UNITED STATES PATENTS

| | | |
|---|---|---|
| 2,216,219 | Wiley | Oct. 1, 1940 |
| 2,429,833 | Luce | Oct. 28, 1947 |
| 2,455,145 | Swanstrom | Nov. 30, 1948 |
| 2,490,663 | Van Uum | Dec. 6, 1949 |
| 2,658,546 | Crowther | Nov. 10, 1953 |
| 2,705,991 | Reiner | Apr. 12, 1955 |

FOREIGN PATENTS

| | | |
|---|---|---|
| 231,366 | Great Britain | Apr. 2, 1925 |
| 804,736 | Germany | Apr. 30, 1951 |

UNITED STATES PATENT OFFICE
CERTIFICATION OF CORRECTION

Patent No. 2,968,329                              January 17, 1961

Kenneth Reiner

It is hereby certified that error appears in the above numbered patent requiring correction and that the said Letters Patent should read as corrected below.

Column 3, line 70, after "of" insert -- the downwardly extending --; column 4, line 31, for "restraining downwardly extending" read -- downwardly extending restraining --; column 5, line 15, for "of the" read -- formed of --; column 8, line 9, for "shroud" read -- shrouded --.

Signed and sealed this 6th day of June 1961.

(SEAL)
Attest:

ERNEST W. SWIDER                                        DAVID L. LADD

Attesting Officer                                            Commissioner of Patents